US012698704B2

(12) United States Patent
Ayris et al.

(10) Patent No.: US 12,698,704 B2
(45) Date of Patent: Aug. 4, 2026

(54) SURVEY TOOL SYSTEM FOR BLAST HOLE DRILLING RIGS

(71) Applicant: DEVICO AS, Heimdal (NO)

(72) Inventors: Michael Ayris, Welshpool (AU); John T. Flam, Heimdal (NO); Alexander Butler, Heimdal (NO); Arnstein Løvø, Heimdal (NO); Rune Lindhjem, Heimdal (NO)

(73) Assignee: DEVICO AS, Heimdal (NO)

( * ) Notice: Subject to any disclaimer, the term of this patent is extended or adjusted under 35 U.S.C. 154(b) by 0 days.

(21) Appl. No.: 18/549,116

(22) PCT Filed: Mar. 7, 2022

(86) PCT No.: PCT/IB2022/051972
§ 371 (c)(1),
(2) Date: Sep. 5, 2023

(87) PCT Pub. No.: WO2022/185289
PCT Pub. Date: Sep. 9, 2022

(65) Prior Publication Data
US 2024/0141775 A1 May 2, 2024

(30) Foreign Application Priority Data

Mar. 5, 2021 (AU) ................................ 2021900636
Aug. 3, 2021 (AU) ................................ 2021212011

(51) Int. Cl.
*E21B 47/022* (2012.01)
*E21B 7/02* (2006.01)
*G01C 19/34* (2006.01)

(52) U.S. Cl.
CPC ............ *E21B 47/022* (2013.01); *E21B 7/025* (2013.01); *G01C 19/34* (2013.01)

(58) Field of Classification Search
CPC ....... E21B 47/022; E21B 7/025; G01C 19/34; E21D 9/006
See application file for complete search history.

(56) References Cited

U.S. PATENT DOCUMENTS 4,047,306 A * 9/1977 Otte ...................... E21B 47/022
33/314
4,199,869 A 4/1980 Van Steenwyk
(Continued)

FOREIGN PATENT DOCUMENTS

AU 2015234298 A1 5/2016
EP 3725998 A1 10/2020
(Continued)

OTHER PUBLICATIONS

Third party WIPO report (Year: 2023).*
(Continued)

*Primary Examiner* — Steven A MacDonald
(74) *Attorney, Agent, or Firm* — Stites & Harbison, PLLC; Terry L. Wright

(57) ABSTRACT

A survey tool system (100) for surveying deviation of a previously drilled hole (10, 20) from a selected hole path (30) comprises: an assembly of drill pipe sections (55) co-operable with said previously drilled hole (10, 20); and at least one sensor (125) included within the assembly of drill pipe sections (55) for collecting survey data including data correlated with deviation of said previously drilled hole (10, 20) from said selected hole path (30). A processor (130) processes data collected from the at least one sensor (125) and determines deviation of the previously drilled hole (10, 20) from the selected path (30) for said previously drilled hole (10, 20).

19 Claims, 2 Drawing Sheets

(56) References Cited

U.S. PATENT DOCUMENTS

| | | | |
|---|---|---|---|
| 4,433,491 A | 2/1984 | Ott et al. | |
| 4,461,088 A | 7/1984 | Van Steenwyk | |
| 4,471,533 A | 9/1984 | Van Steenwyk | |
| 4,537,067 A | 8/1985 | Sharp et al. | |
| 4,611,405 A | 9/1986 | Van Steenwyk | |
| 4,799,546 A * | 1/1989 | Hensley | E21B 23/14 |
| | | | 175/50 |
| 4,933,640 A * | 6/1990 | Kuckes | E21B 47/0228 |
| | | | 175/45 |
| 5,432,699 A | 7/1995 | Hache et al. | |
| 5,606,124 A | 2/1997 | Doyle et al. | |
| 5,657,547 A | 8/1997 | Uttecht et al. | |
| 6,651,496 B2 * | 11/2003 | Van Steenwyk | E21B 47/022 |
| | | | 702/9 |
| 6,714,870 B1 | 3/2004 | Weston et al. | |
| 8,011,447 B2 * | 9/2011 | Keniston | E21D 9/006 |
| | | | 175/45 |
| 10,012,068 B2 | 7/2018 | O'Reilly | |
| 10,370,954 B2 * | 8/2019 | Heinonen | E21B 47/02 |
| 10,689,969 B2 * | 6/2020 | Ledroz | G01C 19/02 |
| 12,012,847 B2 * | 6/2024 | Ledroz | E21B 47/022 |
| 2002/0056201 A1 | 5/2002 | Dallas et al. | |
| 2004/0073369 A1 | 4/2004 | McElhinney | |
| 2007/0151761 A1 * | 7/2007 | Keniston | E21D 9/003 |
| | | | 175/40 |
| 2010/0096186 A1 | 4/2010 | Ekseth et al. | |
| 2010/0300755 A1 | 12/2010 | Trinh et al. | |
| 2012/0245850 A1 * | 9/2012 | Bang | G01C 21/166 |
| | | | 702/9 |
| 2015/0240632 A1 * | 8/2015 | Heinonen | E21B 47/26 |
| | | | 175/50 |
| 2015/0275583 A1 * | 10/2015 | Angelici | |
| 2016/0032709 A1 * | 2/2016 | Ledroz | E21B 47/022 |
| | | | 73/152.54 |
| 2016/0076359 A1 | 3/2016 | Danisch | |
| 2016/0208596 A1 * | 7/2016 | Ash | E21B 47/18 |
| 2017/0175517 A1 * | 6/2017 | Ledroz | G01C 19/02 |
| 2018/0128101 A1 * | 5/2018 | Ledroz | G01C 19/38 |
| 2018/0306944 A1 * | 10/2018 | Ledroz | E21B 47/0228 |
| 2019/0078427 A1 * | 3/2019 | Gillan | E21B 47/09 |
| 2020/0408085 A1 * | 12/2020 | Lloyd | E21B 47/022 |
| 2021/0095557 A1 * | 4/2021 | Xu | E21B 7/10 |
| 2022/0186603 A1 * | 6/2022 | Samuel | E21B 47/007 |
| 2022/0186607 A1 * | 6/2022 | Ledroz | E21B 47/092 |

FOREIGN PATENT DOCUMENTS

| | | |
|---|---|---|
| WO | 2007/069993 A1 | 6/2007 |
| WO | 2016/065402 A1 | 5/2016 |

OTHER PUBLICATIONS

3rd party WIPO (Year: 2023).*

European Patent Office, International Search Report issued in corresponding Application No. PCT/IB2022/051972 mailed May 20, 2022.

European Patent Office, International Preliminary Report on Patentability issued in corresponding Application No. PCT/IB2022/051972 mailed Mar. 15, 2023.

Instituto Nacional De Propiedad Industrial INAPI—Chile, First Examination Report issued in corresponding Application No. 202302627 mailed Sep. 2, 2024. (Translation not available.).

* cited by examiner

SURVEY TOOL SYSTEM FOR BLAST HOLE DRILLING RIGS

FIELD OF THE INVENTION

The present invention relates to a survey tool system for drilled holes, in particular holes drilled by blast hole drilling rigs.

BACKGROUND

Drill holes tend to deviate from an intended path, often a straight path, and this is the case also for holes drilled for blasting purposes. Causes of deviation away from the planned end of hole position can be attributed to setup and alignment error, sensor imperfections and calibration errors, variations in rock formation and mechanics, the inability to perform drilling practices to manage variables such as feed pressure and rotation speed, the inability to control drilling over significant lengths or at significant inclinations. Deviations away from the planned blast hole by 10 percent of the hole length are not uncommon. Blast hole deviation can contribute to rock overbreak, dilution of ore with waste rock, poor fragmentation of the rock, and bridging of the rock. Last, but not least, a blast hole that deviates in a different direction than planned may present a serious danger to both equipment and personnel.

Using a drill rig, a blast hole is typically drilled to a length of 15-30 meters, with some blast holes drilled to as long as 60 m into a rock formation. The holes are then loaded with explosives to enable blasting in a mining operation. To have full control over the blasting process, maintaining safety and achieving the planned result, it is necessary to know the trajectory or path of the blast holes and compare to the planned position for the blast holes. Ideally, the exact path of each blast hole should be known as well as any deviation of a blast hole from the planned path.

Due to the difficulty in surveying blast holes, the holes are typically assumed to be straight with no adjustments being made prior to firing of the explosives.

In the underground mining application, mining companies are continually looking at methods to reduce costs and improve productivity. In the sub level mining method, it is advantageous to extend the distance between each sub level reducing the number of development sub drives required. In order to achieve this, longer production holes must be drilled and knowledge of the end of blast position is critical prior to firing.

Surveying blast holes is typically done utilising traditional magnetic or gyroscopic surveying instruments after blast hole(s) have been drilled. Such surveys can typically only commence after the drill rig has completed its drilling programme and moved away from the blast hole(s).

With the drill rig out of the way, survey instruments, often quite heavy, are typically manually pushed or fed by gravity into the blast holes with survey pipes, poly pipes, fiberglass rodder or wire rope and stopped at a set interval to record direction and inclination. The surveyor must measure the depth as the survey instrument progresses into the hole and relate it to the recorded data. This may be done by marking the survey pipes or attaching additional depth counter devices. The depth interval may be the distance between each survey recording. Such surveying methods have a number of deficiencies as follows.

Sensors used for measuring deviation are inherently imperfect and subject to error. For gyroscopic sensors, as described, for example, in the Applicant's Australian Patent No. 2015234298, the contents of which are hereby incorporated herein by reference, such error is conventionally referred to as bias error. The accuracy and reliability of modern gyroscopic sensors, such as gyroscopes, is often described in terms of their bias drift or bias instability. Bias errors grow with time so, unless abated, they will accumulate when a gyroscope is used causing an increasingly significant reduction in survey accuracy.

Further, in an underground setting, for instance in a tunnel or mining operation, the blast holes may be located high above floor level. Basket lifts or elevated work platform may therefore be required for the surveyor to perform the surveys. Surveying holes high above floor level (upholes) typically involves physically demanding manual pushing and is not possible past a certain depth depending on the weight of the survey instrument.

Still further, the above described method suffers from high risk to the survey instrument as caving may occur in the blast hole. Such caving may jam the instrument, potentially causing permanent damage to the instrument and/or making it impossible to retrieve and re-use and therefore representing a cost. A jammed instrument could also disrupt the surface or underground blast process, another cost.

The above-mentioned surveying methods are labour intensive, time consuming, costly, and prone to error such as bias error as described above. For these reasons surveying is typically only done on a fraction of the drilled blast holes in a limited quality assurance process. Moreover, the surveying is typically done only after an entire drill-program has been completed. Hence the surveying results are only made available after drilling is complete, often making it too late to take any corrective action if deviation or end of hole position exceeds the required limits.

The present invention attempts to overcome at least in part the aforementioned disadvantages of previous blast hole surveying.

SUMMARY OF THE INVENTION

In accordance with one aspect of the present invention there is provided a survey tool system for surveying deviation of a previously drilled hole from a selected hole path comprising:

an assembly of drill pipe sections co-operable with said previously drilled hole;

at least one sensor included within the assembly of drill pipe sections for collecting survey data including data correlated with deviation of said previously drilled hole from said selected hole path;
  and
  a processor for processing said data collected from said at least one sensor and determining deviation of said previously drilled hole from said selected path for said previously drilled hole.

Deviation, as measured by the at least one sensor is in hole deviation and is conveniently determined as change or difference in azimuth or inclination between the selected or plan hole path (typically a straight path) and the actual path of the previously drilled hole. However, deviation in collar set up may also be measured by the survey tool system recording data at collar, or 0 depth, in addition to in hole deviation, to enable total deviation to be measured and acted on through corrective action, as described below, if necessary.

The sensor or logging instrument may include one or more of a gyroscopic sensor, a magnetometer, an accelerometer, an inclinometer or like sensors. Preferably, a gyroscopic sensor is included. Temperature sensors and other sensors may be included dependent on the survey data to be collected.

The sensor is conveniently included within a survey tool assembly movable into the previously drilled hole. A survey tool assembly may conveniently comprise a section of drill pipe (also known as a rod or sub) which houses the at least one sensor.

In a preferred embodiment, the assembly of drill pipe sections forms a drilling string that can be pushed into the previously drilled hole, desirably by a drill rig which could conveniently be the same drill rig as was used for drilling the hole. In this embodiment, the survey tool assembly is conveniently mounted at the front of the drilling string and may be conveniently substituted for a drill bit assembly or drill sub used during drilling of the previously drilled hole(s).

The survey tool system conveniently includes communication means for communicating data between the survey tool assembly and processor which can form part of a control system, conveniently a surface controller, for controlling operation of the survey tool system. Wireless communication, for example through Bluetooth or other wireless protocol including WiFi, IR, NFC or similar, is preferred as this avoids possible need to dismantle the survey tool to download data and lost time associated with such a step.

While survey data may be continuously communicated to the processor, though with anticipated difficulty with wireless communication, survey data is preferably collected continuously, stored in on-board memory of the survey tool assembly, and communicated to the processor at the end of a survey extending between selected positions in the previously drilled hole. An end of a survey may be indicated by a selected end position. Conveniently, the selected end position is toe position, i.e. the end of the previously drilled hole, when the survey tool assembly reaches that selected position (e.g in a survey from collar to toe position or a proximate position). Conversely, the selected end position is the depth of the hole where the survey tool assembly reaches that selected end position.

In another embodiment, the assembly of drill pipe sections may be left in situ after drilling the previously drilled hole and the survey tool assembly may be moved inside the assembly, conveniently by a drill rig. Such an embodiment requires that the inner diameter of the drill pipe sections be large enough to allow movement of the survey tool assembly through the assembly of drill pipe sections.

The processor may be included within the survey tool assembly itself, a device such as a laptop, personal computer or cloud server. It can form part of the control system for the survey tool system and/or drill rig and be located remotely to the survey tool assembly. The processor may include a plurality of networked devices to enable determination of deviation of the previously drilled hole from the selected hole path.

The processor may, among other functions, enable display of deviation, desirably measured as described above, as a function of depth.

In another aspect, the present invention provides a method for surveying deviation of a previously drilled hole from a selected hole path comprising:

co-operating an assembly of drill pipe sections with said previously drilled hole;

collecting survey data from at least one sensor included within the assembly of drill pipe sections, said survey data including data correlated with deviation of said drilled hole from said selected path; and processing said data collected from said sensor and determining deviation of said previously drilled hole from said selected hole path.

Conveniently, the assembly of pipe sections is a drilling string which is conveniently operated by a drill rig which may be autonomously operated, preferably by a control system as above described. This is advantageous, because, if further drilling is required, as a corrective action in response to deviation in hole path being above an acceptable threshold, time can be saved through not requiring the drilling rig to be transported back to site.

Conveniently, the sensor(s)—usually included within a survey tool assembly—is used to measure or log data as the drilling string and survey tool assembly is moved in a previously drilled hole, conveniently by a drill rig. The survey data may be data from which deviation of the path of the previously drilled hole from selected hole path can be derived.

Survey data may be collected, desirably continuously, as the drilling string and survey tool assembly is moved through each depth interval. Survey data may be collected as the drilling string and survey tool assembly is pushed through each depth interval. Data may also be collected during pulling of the drilling string from the previously drilled hole allowing a further survey of the same previously drilled hole. This further improves survey accuracy.

However, as the drilling string is pushed further into the previously drilled hole, it is typically necessary to add drill subs or sections of drill pipe to the drilling string. Similarly, as the drilling string is retracted, it is typically necessary to remove drill subs or sections of drilling pipe from the drilling string. Such addition or removal of drill subs or sections of drilling pipe are done during a 'standstill period' in which pushing or pulling the drilling string by the drill rig is stopped. During a standstill period, the survey tool assembly is desirably held stationary as the drill rig and drilling string are not being operated. As the length of the drilling string and any drill subs or sections of drill pipe is known, depth can be readily calculated. Measured rotation of the drilling string may also be used for purposes of depth measurement and other techniques are not precluded. Determination of depth is important to provide an accurate correlation between deviation and depth for the previously drilled hole.

Preferably, the survey tool system utilises a combination of stand still periods and known lengths of drill subs or drill pipe to determine depth, allowing determination of deviation as a function of depth.

The survey tool system may determine a starting direction for the survey either autonomously or by manual selection of a starting direction by a range of techniques ranging, for example, from use of a theodolite to a GPS positioning system. The starting direction does not necessarily have to correspond with the starting direction of the blast hole and provides flexibility in the surveying method. In such case a fixed direction may be measured outside of the hole and the starting direction of the drilling string aligned with this direction. The starting direction can be conveniently provided by a further gyroscope, preferably a North seeking gyro or land surveying techniques. A gyroscope may be preferred and it would typically be located external to the survey tool assembly.

Preferably, where the survey tool system calculates excessive deviation of the previously drilled hole away from a selected hole path, a drill rig operator is alerted to take corrective action. Corrective action performed by the drill rig operator may include but are not limited to changing equipment (such as drill bits), modifications to software settings to correct pathing or adapt to environmental conditions, and readjusting operating procedures.

As described above, bias error can affect survey accuracy. The method desirably includes step(s) to address bias error. For example, bias error can be reduced through use of a drill rig which allows controlled movement of the survey tool assembly in a manner much harder to achieve with manual operations. The drill rig can be operated to rotate the drilling string, preferably at a constant rate when moving the drilling string between selected depth intervals for data collection from the sensor or logging instrument. Rotation of the drilling string, in turn, causes rotation of the survey tool assembly and its sensor or logging instrument about its axis between each depth interval which reduces influence of bias errors. Further, during a standstill period, a drill rig—with capacity to hold the survey tool assembly almost perfectly still—has the ability to offer much more reliable standstills than manual feeding, by an operator, of the survey tool assembly into the assembly of drill pipes. Drift checks may also be done during standstill periods and compensation allowed for by the processor. Further, where bias errors accumulate with time, the method—through being efficient and with the possibility of being completed quite fast for typical holes (say around 20 m deep)—can be performed with less influence of bias error.

The survey tool assembly could also include a centraliser apparatus, preferably as described in Australian Patent No. 2015234298, to assist in minimising bias error though this option is more suitable for open holes than blast holes.

In the embodiment where the assembly of drill pipe sections is left in situ after drilling the previously drilled hole, the survey tool assembly may be moved within the assembly of drill pipe sections, conveniently by the drill rig. In this case, continuous movement of the survey tool assembly through the assembly of drill pipe sections for collection of data is possible, at least because sections of drill pipe do not require to be added or removed, and preferred.

The survey tool system may also be used to determine proximity of the logging instrument to other previously drilled holes. As the position of the logging instrument is known and the processor can be provided with information, in terms of azimuth and inclination, about position of proximate holes from a data storage device, proximity can be detected by comparison of stored and logged and/or processed data. Corrective action can be implemented if the proximity is less than an acceptable threshold.

Corrective action may be implemented if the determined deviation of the previously drilled hole from said selected hole path is above an acceptable threshold. The processor may be connected to a display or other device to provide an alert to a drill rig operator that corrective action is required. Corrective actions may include but are not limited to a step selected from the group consisting of changing equipment (such as drill bits), modifications to drill rig operating software settings to correct pathing or adapt to environmental conditions and readjusting operating procedures such as adjusting firing of explosives located within blast holes to compensate for deviation in blast hole trajectory from the planned trajectory.

The survey tool system and method, as above described, address at least some of the drawbacks of the prior art including but not limited to:

improving blast hole surveying efficiency through decision making at the rig;

make surveying an integral part of the blast hole drilling operation, with survey data being made available directly after drilling each blast hole;

improving survey accuracy through rotation of the drill rods between each depth interval;

reducing the number of sub levels required in the mining process;

removing the reliance of extra survey personnel/contractors;

removing risk of injury to personnel working at heights;

removing the need for lifting equipment and elevated work platforms;

removing the need for tape measure or additional depth control devices; and reducing the risk of jamming the survey instrument.

While the survey tool system and method of surveying described above have particular application to surveying of deviation of drilled blast holes from a selected path, it will be understood that the survey tool system and method of surveying may be applied to surveying of deviation of other drilled holes from a selected or planned path or trajectory.

BRIEF DESCRIPTION OF DRAWINGS

A preferred embodiment of the present invention will now be described, by way of example, with reference to the accompanying drawings, in which.

DESCRIPTION OF PREFERRED EMBODIMENTS

Figure 1:
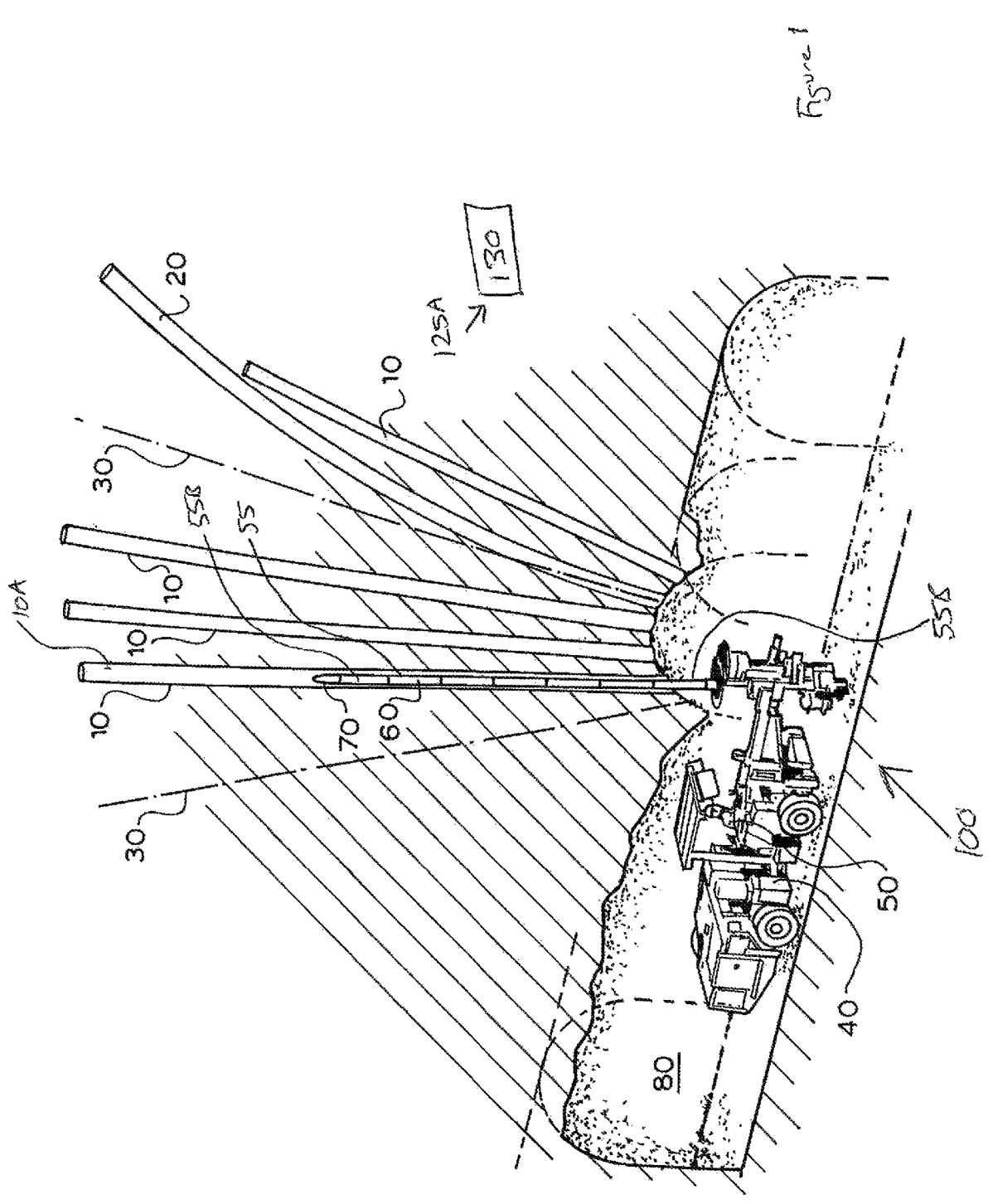
FIG. 1 is a cross-sectional perspective view of a survey tool system in use for surveying of a blast hole according to one embodiment of the present invention.

FIG. 1 depicts a blast hole drilling operation in an underground mine 80 wherein a blast hole drill rig 40, piloted by a drill rig operator 50, has been used to drill blast holes 10 with a drilling string for location of explosives for use in the mining operation. Suitable drill rigs, such as horseshoe rigs and boom rigs, and the basic construction and operation of drilling strings are well understood in the drilling art and are not further described here. The selected, planned or design path of a previously drilled blast hole is shown as 30. The selected blast hole path is straight and radiating outwardly from the mine. A deviating blast hole 20 is shown to deviate from the corresponding intended path 30.

As a blast hole is completed, the drilling string (not shown but similar to drilling string 55) is retrieved from the blast hole 30, by blast hole drill rig 40, and the drilling bit assembly is replaced with the survey tool assembly 70. There is thus provided a survey tool system 100 for surveying the previously drilled hole 10, 20 including surveying deviation of the previously drilled hole 10, 20 from selected hole path 30 comprising: a drilling string 55 co-operable with said previously drilled hole for the purposes of performing the survey.

A sensor or logging instrument 125 is included within the survey tool assembly 70 for collecting data correlated with deviation of the previously drilled hole 10 or any other previously drilled hole 10, 20 from the selected hole path 30. In this embodiment, the logging instrument 125 has an on board memory to store the collected data as the survey proceeds.

Also included, in this embodiment at the surface, is a processor 130 for processing data collected from the sensor 125 and determining deviation of the previously drilled hole 20 from the selected path 30. The processor 130 can form part of a control system for the survey tool system 100 and, in this case, the drill rig 40 since controlled operation of the drill rig 40 to move the survey tool assembly 70, as described further below, is an important feature of the survey method of the present embodiment.

The sensor or logging instrument 125 is included within a survey tool assembly 70 connected to the front of drilling string 55 as shown in FIG. 1. The survey tool assembly 70, which may also be termed a pressure barrel, is mechanical pressure and impact resistant and has approximately the same diameter as the drilling string 55.

The drilling string 55 has slightly smaller diameter than the blast hole 10, 20. As the survey tool assembly 70 has the same diameter as the drilling string 55, the risk of caving of the blast hole 10, 20 or jamming of the survey tool assembly 70 is reduced.

Figure 2:
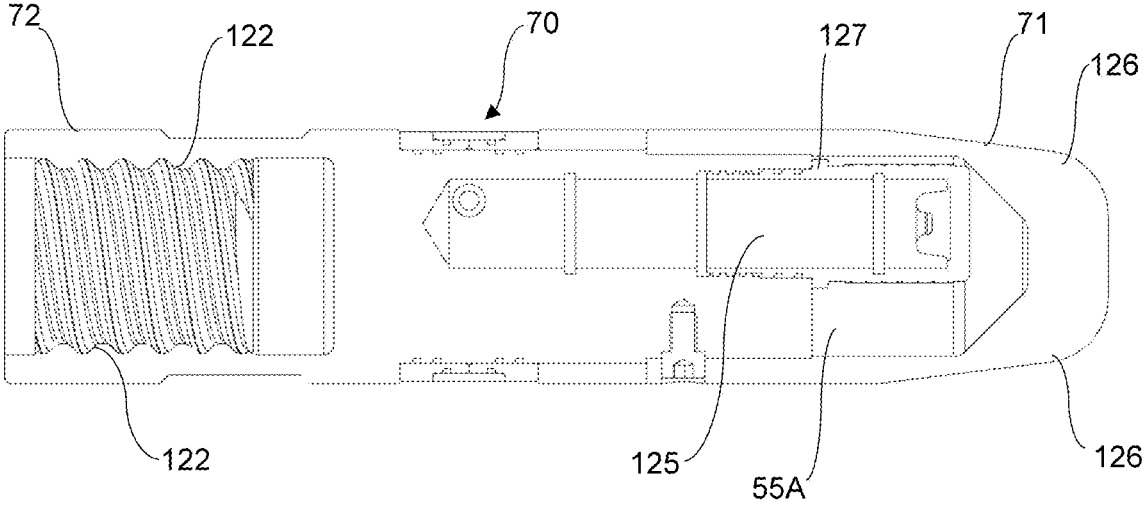
FIG. 2 is a schematic view of a survey tool assembly forming part of the survey tool assembly shown in FIG. 1.

The survey tool assembly 70, shown in further detail in FIG. 2, is conveniently a drill sub configured to serve as the survey tool assembly 70. As shown in FIG. 2, at the back end 72 of the survey tool assembly 70 is a threaded section for mounting onto a complementary threaded section (not shown) of the drilling string 55.

The front 71 of the survey tool assembly 70 has rounded portions 126 in order to smoothly enter the previously drilled hole 10 without catching the sidewall 10A. The front 71 of the survey tool assembly 70 may be fitted with carbide cutters (not shown) in order to work through a small hole collapse.

The logging instrument 125 is surrounded by rubber damping means 127, here of rubber though coil springs could be used. This minimises vibration that may adversely influence data collected by the logging instrument 125. It also prevents contact between the logging instrument 125 and the pressure barrel of survey tool assembly 70. This also reduces vibration effects but also reduces any temperature effects, which may influence bias error, because any temperature effects external to the pressure barrel of survey tool assembly 70 will transmit—if at all—with a delay, and then gradually, due to the absence of contact between logging instrument 125 and the pressure barrel.

The survey tool assembly 70 may, in embodiments depending on survey data to be collected, include a variety of sensors, preferably including one or more accelerometers, one or more gyroscopes, one or more magnetometers and one or more temperature sensors to collect survey data as desired. If necessary, the sensors may be located in a plurality of drill pipe sections or subs.

In the embodiment of FIGS. 1 and 2, the logging instrument 125 is a solid state gyroscopic sensor mounted within the chamber or bore 55A of the survey tool assembly 70. A range of gyroscopic sensors may be suitable including 'true north' and 'rate' gyroscopic sensors. In this embodiment, the gyroscopic sensor 125 is a continuous rate gyro manufactured by Devico AS, Norway, and available from DHS (Aust.) Pty Ltd under the trade mark DeviGyro™.

The survey tool assembly 70 conveniently includes communication means for wirelessly communicating data 125A between the logging 125 and processor 130 which here forms part of a surface controller for controlling operation of the survey tool system 100. The survey tool assembly 70 includes an integrated antenna (not shown) allowing wireless transfer of signals to and from the logging instrument 125.

Wireless communication of data 125, for example through Bluetooth or other wireless protocol including WiFi, IR, NFC or similar, is preferred as this avoids possible need to dismantle the survey tool assembly 70 to download data and lost time associated with such a step. However, the survey tool assembly 70 could be provided with on-board processing capabilities and on-board memory. This allows the logging instrument 125 to sample data continuously and for extended periods of time before the data is downloaded at the end of the survey from the on-board memory of the logging instrument 125 to the processor 130

Operation of the survey tool system 100 will now be described.

At commencement of surveying, the survey tool assembly 70 is communicated with the processor 130 for initialization through appropriate communication and logging software. The gyroscopic sensor 125 is also initialised or activated by a magnet.

At the commencement of surveying, the drill rig 40 is oriented such that the drilling string 55 including survey tool assembly 70 can be inserted into the hole collar and pushed into the blast hole 10, 20 by the drill rig 40.

The survey tool assembly 70 must be initially aligned in a known starting direction allowing the survey tool assembly to accurately collect azimuth and inclination data for the previously drilled hole 10, 20 to enable accurate measurement of hole deviation from the selected path by logging instrument 125. That is, the logging instrument 125 measures change in direction from a start point, and then converts this to absolute direction by adding the starting direction information. At the start of the hole/survey, the logging instrument 125 will assume 0, and then calculate directional change to be used in determination of in hole deviation as it progresses down the hole.

In case the survey tool system 100, and in particular its processor 130, is not able to determine an absolute heading for the drilling string 55 and survey tool assembly 70 autonomously, a predetermined starting direction aligned with the survey tool assembly 70 can be selected in various ways. The absolute direction is, in this embodiment, conveniently provided by a further gyroscope, preferably a North seeking fibre optic gyro, given that the logging instrument 125 is a 'rate' gyroscopic sensor. A suitable gyro is manufactured by Devico AS, Norway, and is available from DHS (Aust.) Pty Ltd under the trade mark Devi-Aligner™.

The starting direction does not necessarily have to correspond with the starting direction of the blast hole 10, 20. A fixed direction may instead be measured from somewhere outside of the hole 10, 20 and the logging instrument 125 initially aligned with this direction. This allows starting directions for surveying corresponding to drill rig 40 positions that can be conveniently measured. This introduces flexibility which is highly desirable from an operator viewpoint.

The survey tool system 100 may determine directional collar setup error to allow total deviation (i.e. collar setup error plus in hole deviation). To this end, the logging instrument 125 may log direction of the hole at collar, or 0 depth, based on starting direction as above described.

The drilling string 55, with the survey tool in the front, is pushed further into the blast hole utilising the drill rig 40, and the survey tool system 100 starts its logging of azimuth and inclination data from gyroscopic sensor 125. Additional data may be captured from further sensors if included in the survey tool assembly 70 according to embodiments of the invention. As the drilling string 55 and survey tool assembly 70 is pushed into the previously drilled blast hole 10, the logging instrument 125 is continuously logging azimuth and inclination data to be processed by processor 130 on download of the logged data to determine deviation of the blast hole 10 from its selected or planned path.

As a survey progresses, additional sections of drill pipe 55B are attached as the drilling string 55 is pushed further into a blast hole 10 to extend the length of the drilling string 55 and capacity to survey deeper into the hole. FIG. 1 shows a stage at which an additional section of drill pipe 55B is required to be added to the drilling string 55 to extend its length. Each additional section of drill pipe 55B has a known length. During this time, operation of the drill rig 40 and drilling string 55 is stopped for a 'standstill period', in the range 5 to 20 seconds, sufficient to allow mounting of the additional section of drill pipe to the drilling string 55.

At the same time, the survey tool assembly 70 records gyroscopic sensor data during the standstill period as well as while it is in motion. The requirement for a standstill period may be correlated with a known depth, thus setting a depth interval because the length of a drilling pipe section, say 1.5-2 m, is known. When azimuth and inclination data is downloaded from the logging instrument 125, the data will show that there are regular periods (where a constant depth interval is adopted) with no movement of the survey tool assembly 70, indicating a standstill. With the known length of drill pipe, the true depth of any standstill can be found by summing the number of previous standstills before. This allows depth to be accurately measured for purposes of developing an accurate correlation between deviation and depth.

Bias error in data collected by the survey tool assembly 70, which can affect survey accuracy, is addressed in a number of ways. Use of drill rig 40 allows controlled movement of the survey tool assembly 70 in a manner much harder to achieve with manual operations.

First, the drill rig 40 can be operated to rotate the drilling string 55, preferably at a constant rate, when moving the drilling string 55 between selected depth intervals for data collection from logging instrument 125. Rotation of the drilling string 55, in turn, causes rotation of the survey tool assembly 70 and logging instrument 125 about its axis between each depth interval which reduces influence of bias errors. Rotation can be controlled by the drill rig 40 control system with a high degree of precision.

Second, during a standstill period, drill rig 40—with capacity to hold the survey tool assembly 70 almost perfectly still—has the ability to offer much more reliable standstills than a manual process.

Drift checks may also be done during standstill periods and compensation for error allowed for by the processor 130. Further, typically bias errors accumulate with time, so the survey method—through being efficient and with the possibility of being completed quite fast for typical holes (say around 20-25 m deep)—can be performed with less influence of bias error.

Rotation of the drilling string 55 by drill rig 40 is sufficiently accurate and uniform, in this embodiment, that it may also be used as a check for measuring depth. The logging instrument 125 logs data correlated to the rotation throughout the survey run and an estimated depth may be calculated, during data processing by processor 130, by dividing the logged number of rotations achieved by the known number of rotations per metre. Accuracy can be improved, for example, where survey runs are conducted both during pushing of drilling string 55 into the previously drilled hole 10, 20 and during pulling of drilling string 55 from the previously drilled hole 10, 20. Here the sum of the depth calculations obtained for the complete sequence of runs is averaged.

As the survey tool assembly 55 reaches near the end 10A of the drill hole 10, operation of the drilling string 55 is stopped and end of the survey is marked. If desired, an additional independent survey of deviation may now be performed, following the same survey process as above described, as the drilling string is retrieved from the blast hole 10. During the retrieval process, the drill rig 40 and drilling string 55 operation will be stopped and survey tool assembly 70 will again be held stationary for a standstill period. In this case, the standstill period corresponds with an event in which a section of drilling pipe 55B is removed from the drilling string 55, reversing the process described above since the length of drilling string 55 is reduced as it is retrieved from the blast hole 10.

Upon retrieval of the survey tool assembly from the blast hole 10, 20, the survey data is transferred from the survey tool assembly 70 wirelessly to the processor 130. The processor 130 captures the azimuth and inclination data (and any further survey data collected by survey tool system 100). The actual hole 10, 20 azimuth data can be compared with plan azimuth and inclination data for the holes 10, 20 to provide raw deviation data.

Depth is captured through detection, by the processor 130, of the periods of standstill, as above described, and knowledge of drilling string length. By inserting the length of the drilling pipe into the processor 130, the full survey data can be calculated by correlating this length with each period of standstill. The processor 130 enables the survey results to be presented on a display, or otherwise, as deviation as a function of depth. The survey results may further be exported to a storage medium or through a network, for example a cloud network, for further processing and analysis.

Further information derived from the depth and deviation data may also be presented, including but not limited to deviation from a straight path, distance from a planned blast hole, distance between two or more blast holes through comparison of logged and processed data with stored data as described above, distance between a blast hole and a surface and warning systems for any data outside set acceptable thresholds.

The survey method is continued, in this embodiment, for a plurality of blast holes 10, the locations of which are selected to correlate with the blasting strategy. It will be noted that one blast hole 20 deviates significantly from its planned path significantly (for example 4.45 m at 25 m depth) compared to blast holes 10 (for example 2.5 m at 25 m depth) but the above described process can still be performed.

The data on deviation of a blast hole 10, 20 is then transmitted back to the drill rig operator 50 who can then take corrective action if the determined deviation of the previously drilled hole from said selected hole path is above an acceptable threshold. The processor 130 may be connected to a display or other device to provide an alert to a drill rig operator 50 that corrective action is required.

Corrective actions may include but are not limited to a step selected from the group consisting of changing equipment (such as drill bits), modifications to software settings for operation of drill rig 40 and drilling string 55 to correct pathing or adapt to environmental conditions and readjusting operating procedures such as adjusting firing of the explosives placed in a blast hole 20 with excessive deviation from the planned path.

In the current embodiment, corrective action may not be implemented for blast holes 10 but, for blast hole 20 having a significant deviation from the planned path, a corrective action—as described above—is implemented.

At completion of the survey the survey tool assembly 70 is removed from the drill string 55 and replaced with the drilling bit assembly (not shown) in preparation for drilling of the next blast hole.

In another embodiment, and when the inner diameter of the drill pipe is large enough to allow survey tool assembly 70 to fit within the drill pipe, the assembly of drill pipes of the drilling string 55 may be left in the blast hole at completion of drilling. The survey tool assembly may then be fed inside the drill rods by polyethylene pipe, fiberglass rod, wire rope or similar, powered by the drill rig 40 which allows controlled movement of the survey tool assembly 70 and reduction of bias error in the manner described above. In this case, the survey tool assembly—which may be similar to survey tool assembly 70 as above described, may be continuously fed without stopping (standstill periods not being required) till end of hole 10 is reached, logging data 125A from which depth and deviation from planned path can be derived by processor 130 as logging data 125A is wirelessly received.

Modifications and variations to the survey tool system and method of surveying as would be apparent to a skilled addressee are deemed to be within the scope of the present invention.

The invention claimed is:

1. A survey tool system for surveying deviation of a previously drilled uphole from a selected hole path comprising:
   - an assembly of drill pipe sections co-operable with said previously drilled uphole;
   - at least one sensor included within the assembly of drill pipe sections for collecting survey data including data correlated with deviation of said previously drilled hole from said selected hole path; and
   - a processor for processing said data collected from said at least one sensor and determining deviation of said previously drilled hole from said selected path for said previously drilled hole,
   - characterized in that said at least one sensor is included within a survey tool assembly connected to a frontmost end of the assembly of drill pipe sections and configured to form a terminal end of the assembly of drill pipe sections,
   - wherein an open end of the previously drilled uphole is at a lower elevation than a terminal end of the previously drilled uphole.

2. The survey tool system of claim 1, wherein said at least one sensor includes one or more of a gyroscopic sensor, a magnetometer, an accelerometer, or an inclinometer.

3. The survey tool system of claim 2, wherein the at least sensor includes a gyroscope configured for continuous collection of the survey data.

4. The survey tool system of claim 1, wherein the survey tool assembly includes a further sensor for determining proximity to other previously drilled holes, whether or not included within the survey.

5. The survey tool system of claim 1, wherein the assembly of drill pipe sections forms a drilling string configured to be moved through the previously drilled hole.

6. The survey tool system of claim 1, including communication means for wirelessly communicating data between the survey tool assembly and the processor.

7. A method for surveying deviation of a previously drilled uphole from a selected hole path with a survey tool system, said method comprising:
   - co-operating an assembly of drill pipe sections with said previously drilled uphole, the previously drilled uphole having an open end at a lower elevation than a terminal end of the previously drilled uphole;
   - collecting survey data from at least one sensor included within the assembly of drill pipe sections, said survey data including data correlated with deviation of said previously drilled hole from said selected hole path; and
   - processing said survey data collected from said at least one sensor and determining deviation of said previously drilled hole from said selected hole path,
   - characterized in that said at least one sensor is included within a survey tool assembly connected to a frontmost end of the assembly of drill pipe sections and configured to form a terminal end of the assembly of drill pipe sections, and characterized in that collecting of survey data follows completion of a drilling operation and replacement of a drilling bit assembly with said survey tool assembly.

8. The method of claim 7, wherein a corrective action is implemented in response to deviation in hole path being above a predetermined threshold.

9. The method of claim 7, wherein the at least one sensor is included within the survey tool assembly for measuring data as the survey tool assembly is moved in said previously drilled hole.

10. The method of claim 9, wherein the data is data from which deviation from selected hole path can be derived.

11. The method of claim 9, wherein the drilling string is rotated when moving the drilling string between selected depth intervals for data collection from the sensor or logging instrument.

12. The method of claim 11, wherein the drilling string is rotated at a constant rate.

13. The method of claim 9, wherein the at least one sensor is a gyroscopic sensor for measuring data as the survey tool assembly is moved in said previously drilled hole.

14. The method of claim 7, wherein said survey tool system determines a starting direction of the drilling string.

15. The method of claim 14, wherein said starting direction does not correspond with the starting direction of the hole.

16. The method of claim 14, wherein said starting direction is provided by a gyroscope external to the survey tool assembly.

17. The method of claim 16, wherein said starting direction is provided by a North seeking fibre optic gyroscope external to ta survey tool assembly.

18. The method of claim 14, wherein the starting direction of the drilling string is determined autonomously.

19. The method of claim 7, wherein the assembly of drill pipe sections is in situ within the previously drilled hole and the survey tool assembly is moved inside the assembly of drill pipes.

\* \* \* \* \*